United States Patent

Her

[11] Patent Number: 5,469,224
[45] Date of Patent: Nov. 21, 1995

[54] RECORDING SIGNAL SELECTION METHOD FOR VIDEO TITLING

[75] Inventor: Chung H. Her, Seoul, Rep. of Korea

[73] Assignee: Goldstar Co., Ltd., Seoul, Rep. of Korea

[21] Appl. No.: 908,485

[22] Filed: Jun. 30, 1992

Related U.S. Application Data

[63] Continuation of Ser. No. 613,211, Nov. 13, 1990, abandoned.

[30] Foreign Application Priority Data

Nov. 13, 1989 [KR] Rep. of Korea ............... 16435/1989

[51] Int. Cl.⁶ ..................... H04N 5/262; H04N 5/1278
[52] U.S. Cl. ..................... 348/589; 358/311; 348/586
[58] Field of Search ..................... 358/181, 183, 358/185, 903, 22, 311, 93, 311; 348/578, 586, 584, 588, 589

[56] References Cited

U.S. PATENT DOCUMENTS

| | | | |
|---|---|---|---|
| 4,835,613 | 5/1989 | Johnson | 358/181 |
| 4,935,815 | 6/1990 | Ichikawa | 358/183 |
| 4,999,709 | 3/1991 | Yamazaki | 358/183 |
| 5,016,112 | 5/1991 | Nakajima | 358/185 |
| 5,018,013 | 5/1991 | Rabii | 358/181 |

Primary Examiner—Tommy P. Chin

[57] ABSTRACT

A recording signal selection method for video titling suitable for recording a superimposed signal, consisting of a switching section for selectively selecting a tuner signal, a line signal and a playback signal as an output and transmitting the selected tuner signal, line signal or superimposed signal as a recording signal, a microcomputer for generating the character data which are to be superimposed according to user's need and controlling said switching section, and an on-screen display element for selecting as a background signal one of the tuner signal and line signal from the switching section and transmitting as an output a superimposed signal which a character signal from the microcomputer is superimposed on the background signal.

4 Claims, 2 Drawing Sheets

RECORDING SIGNAL SELECTION METHOD FOR VIDEO TITLING

This application is a continuation of application Ser. No. 07/613,211, filed Nov. 13, 1990, now abandoned.

BACKGROUND OF THE INVENTION

The present invention relates to a method for deciding if a superimposed signal is recorded or a standard signal is recorded when recording, more particularly to a recording signal selection method for a video titling suitable for recording a superimposed signal, in a titling device which displays user-desired characters through an on-screen display element (OSD) controlled by a microcomputer.

FIG. 1 is a block diagram of a conventional recording control system for a video captioner.

As shown in FIG. 1, a tuner signal TS, a line signal LS or a playback signal PS is applied as a standard signal to the composite video signal input terminal CVi of the on-screen display element 3, and, at this time, if a microcomputer 2 transmits character data to the on-screen display element 3, the composite video signal output terminal CVo of the on-screen display element 3 outputs a signal in which a character signal is superimposed on said standard signal. This latter signal is called a superimposed signal.

The superimposed signal is immediately seen by a viewer watching a monitor, and, at this time, if the viewer connects, for recording, a switch SW2 to a tuner fix terminal a1' or a line fix terminal a2', a signal which does not contain a titling signal is output as a recording signal RS, along with a screen different from that at which the viewer has viewed on said monitor.

Accordingly, such a conventional recording signal selection circuit has a drawback in that a superimposed signal as a recording signal can not be displayed on the screen of the monitor even though the superimposed signal itself can be displayed on the screen of the monitor.

FIG. 2 shows a block diagram for another conventional recording signal selection circuit for a video titling.

As shown in FIG. 2, a tuner signal TS, a line signal LS or a playback signal PS is selected and applied as a standard signal to the composite video input terminal CVi of the on-screen display element 3.

If the microcomputer 2 transmits character data to said on-screen display element 3, a superimposed signal is output from the composite video signal output terminal CVo of the on-screen display element 3 as in FIG. 1.

The superimposed signal is immediately seen on a monitor by a viewer, and, at this time, if the viewer turns a switch SW2 on for recording, a superimposed signal in which characters are superimposed on a background scene is provided as a recording signal RS.

Therefore, such a conventional recording signal selection circuit has a difficulty in recording in that recording is to be performed in a recording stop state after having inserted all of the desired characters since it records in a recording state all the characters which are being written.

SUMMARY OF THE INVENTION

It is an object of the present invention to employ a superimposed signal as a recording signal such that all of character data which a viewer wants to display on the screen of the monitor have been set.

This object is attained by providing, as a recording signal, a standard signal which is transmitted to the on-screen display element while setting the characters which are to be superimposed and by employing the output signal of the on-screen display element as a recording signal such that all the characters which are to be superimposed have been inserted thereon.

DETAILED DESCRIPTION OF THE INVENTION

Figure 1:
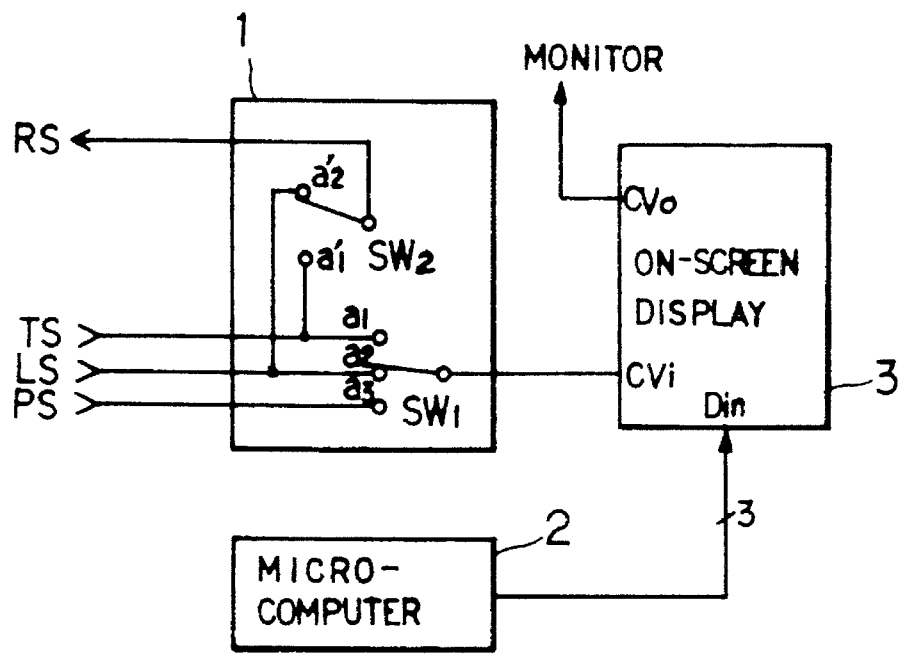
FIGS. 1 and 2 are block diagrams for conventional recording control systems for video titling.
Figure 2:
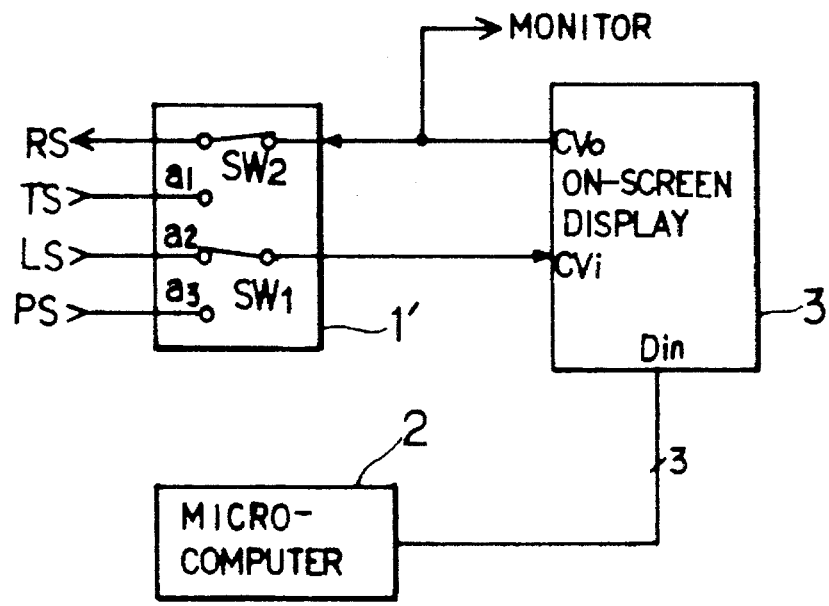
Figure 3:
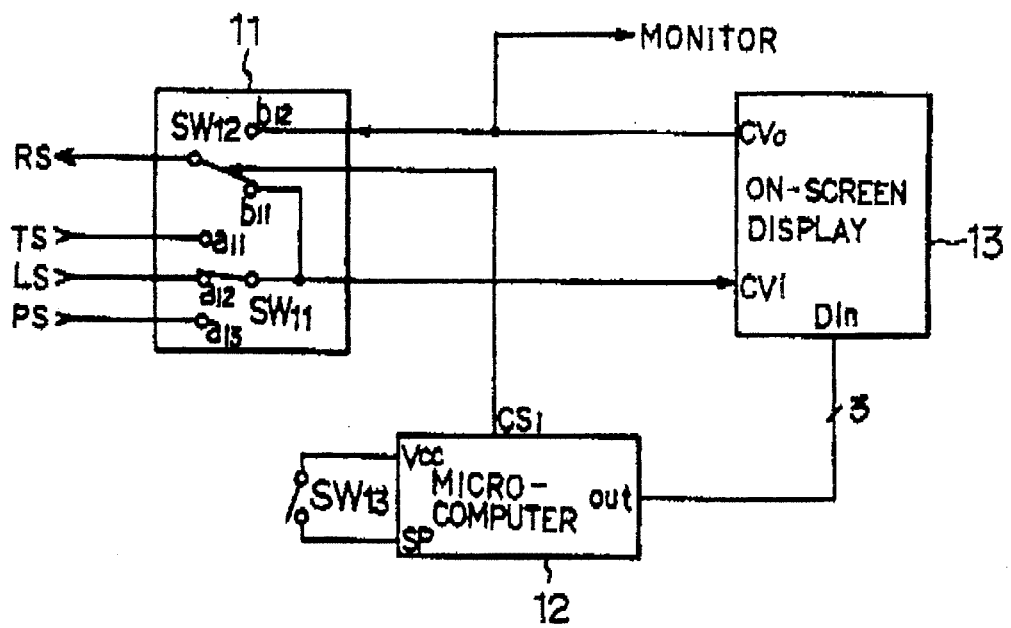
FIG. 3 is a block digram of a system enabling the recording signal selection method for video titling according to the present invention.

FIG. 3 is block diagram of a system for practicing the a recording signal selection method for video titling according to the present invention.

As shown in FIG. 3, the present invention for providing recording signal selection for video titling comprises:

a switching section 11 for selectively selecting a tuner signal TS, a line signal LS on a playback signal PS as an output and transmitting the selected tuner signal TS, line signal LS or superimposed signal as a recording signal RS, a microcomputer 12 for generating the character data which are to be superimposed according to user's need and controlling said switching section 11, and an on-screen display element 13 for selecting the tuner signal TS on the line signal LS from said switching section 11 as a background signal and outputting a superimposed signal in which a character signal from said microcomputer 12 is superimposed on said background signal.

Figure 4:
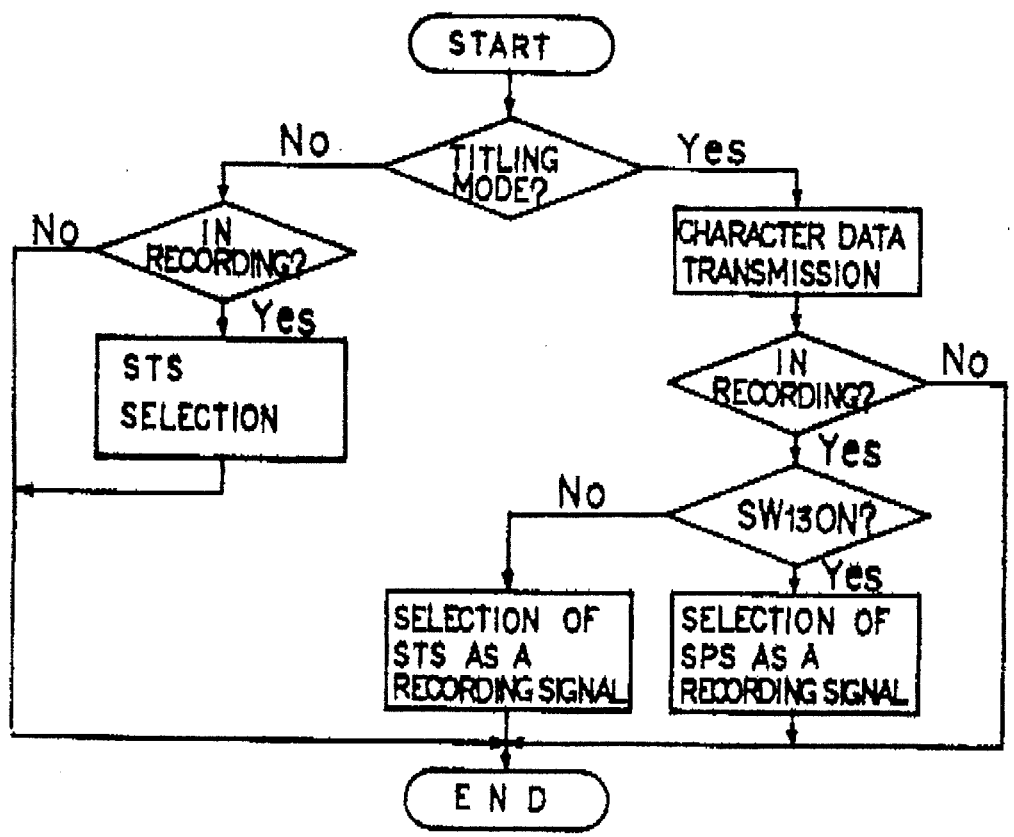
FIG. 4 is a signal flow chart according to the present invention.

The operation and effect of the present invention having such a configuration will be described in detail with reference to FIG. 4.

Even though a user turns the recording signal selection switch SW13 on or off in order to select either a superimposed signal or a standard signal as a recording signal RS, when not in the state of a titling mode, the switch SW12 is kept connected to the fix terminal b11 because the microcomputer does not produce a control signal CS1 irrespectively of the recording mode.

Accordingly, either the tuner signal TS or the line signal LS, which is a standard signal, is provided as a recording signal.

Regardless of whether the microcomputer 12 transmits character data to the on-screen display element 13 in the titling mode, or not in the recording mode at the very point that the microcomputer 12 has transmitted character data to the on-screen display element 13, the switch SW12 of the switching section 11 is kept connected to the fix terminal b11 because said microcomputer 12 does not transmit a high potential control signal CS1 to said switch SW12 of the switching section 11 irrespectively of turning said recording signal selection switch SW13 on or off.

If, however, the microcomputer 12 transmits character data to the on-screen display element 13 in the titling mode, or in the recording mode at the very point that said microcomputer 12 has transmitted character data to the on-screen display element 13, and if the said recording signal selection switch SW13 is turned on by a user, the microcomputer 12 recognizes a high potential at a scan port SP and, in response thereto, transmits a control signal CS1 to said switch SW12 of the switching section 11.

Accordingly, signals of character data which are being set are superimposed on a background signal, the superimposed signal is displayed on the screen of a monitor and is also output as a recording signal RS.

When, in the recording mode, however, and on the way to that mode said microcomputer 12 transmits character data to said on-screen display element 13 in the titling mode. When a user does not turn said recording signal selection switch SW13 on, the tuner signal TS or line signal LS is selected as a recording signal because the microcomputer 12 does not produce a control signal CS1.

Thereafter, at the very point that the on-screen character setting is completed by outputting all of the character data which said microcomputer 12 is to transmit, the composite video signal output terminal CVo of the on-screen display element 13 becomes ready to transmit a superimposed signal that a signal for all of the characters which are to be displayed on a background scene is superimposed on a background signal which turns the background scene.

If the user turns said recording signal selection switch SW13 on, said microcomputer 12 recognizes the turn-on state of the switch 13 and transmits a high potential control signal CS1 to said switching section 11.

Accordingly, the superimposed signal transmitted from said composite video signal output terminal CVo of the on-screen display element 13 is provided as a recording signal and is also displayed on the screen of a monitor because the switch SW12 of the switching means is connected to the fix terminal b12.

As described above in detail, when in the titling mode and while recording, when the microcomputer transmits character data to the on-screen display element, the present invention can select a standard signal as a recording signal, and also when the microcomputer has transmitted the desired character data, the microcomputer controls the switching means to select a superimposed signal as a recording signal, and also when the microcomputer has transmitted the desired character data, the microcomputer controls the switching means to select a superimposed signal as a recording signal.

Accordingly, the present invention can provide a sophisticated screen to a viewer.

What is claimed is:

1. A recording signal selection method for video titling apparatus having a microcomputer, comprising the steps of:

selecting a standard signal from a tuner signal, a line signal and a playback signal and outputting the selected standard signal as a first recording signal to a recording output terminal, in the absence of a control signal from said microcomputer;

outputting character data from said microcomputer in a titling mode of said apparatus, and superimposing said character data and the selected standard signal in said titling mode to produce a superimposed signal;

selectively controlling the microcomputer to output said control signal;

discriminating, with said microcomputer, whether the present mode of the apparatus is a recording mode or not during the transmission of said character data from the microcomputer in said titling mode, and, in response to the presence of said control signal and the detection of said recording mode in said titling mode, outputting said superimposed signal as a second recording signal to said recording terminal.

2. The method of claim 1 wherein said step of selectively controlling the microcomputer comprises controlling a switch connected to the microcomputer.

3. The method of claim 1 wherein said step of selecting a standard signal comprises applying said tuner signal, said line signal and said playback signal to a first selection switch, and said step of outputting comprises applying said superimposed signal to a second selection switch, and controlling said second selection switch with said control signal, and further comprising applying said selected standard signal to said second switch.

4. A recording signal selection apparatus for video titling comprising:

a switching section connected to selectively output a tuner signal, a line signal and a playback signal as a selected standard signal and connected to selectively output the selected standard signal and a superimposed signal as a recording signal to a recording terminal;

a microcomputer connected to control said switching section and to output character data to be superimposed on the standard signal, and an ON-screen display means connected to the microcomputer and said switching section for producing said superimposed signal by adding said character data from said microcomputer to the selected standard signal from said switching section, and outputting said superimposed signal to said terminal via said switching section.

* * * * *